Nov. 21, 1967 YASUO KO 3,354,413

ELECTROMECHANICAL FILTER FOR LOW FREQUENCIES

Filed Nov. 5, 1962 2 Sheets-Sheet 1

Nov. 21, 1967 YASUO KO 3,354,413

ELECTROMECHANICAL FILTER FOR LOW FREQUENCIES

Filed Nov. 5, 1962 2 Sheets-Sheet 2

United States Patent Office 3,354,413

Patented Nov. 21, 1967

3,354,413
ELECTROMECHANICAL FILTER FOR LOW FREQUENCIES

Yasuo Ko, Sagamihara-shi, Kanagawa-ken, Japan, assignor to Kokusai Denki Kabushiki Kaisha, Tokyo-to, Japan, a joint-stock company of Japan Filed Nov. 5, 1962, Ser. No. 235,487
Claims priority, application Japan, Nov. 13, 1961, 36/40,691; Mar. 26, 1962, 37/13,992
4 Claims. (Cl. 333—72)

ABSTRACT OF THE DISCLOSURE

Electromechanical filter having a plurality of resonators assembled as a unit. One of the resonators is vibrated electromechanically to vibrate the others. Pick-off transducers on the other resonators pick-off inverse signals from the other resonators as a combined output and the pass band of the filter is a function of the resonant frequencies of the other resonators.

This invention relates generally to filters and more particularly to a new mechanical wave filter for low-frequency use wherein a tuning fork is utilized.

It is a general object of the invention to provide a new and improved mechanical filter for low-frequency use which has highly desirable features and advantages as will be presently apparent.

The foregoing object has been achieved by the present invention, which, briefly described, provides a mechanical wave filter which can be utilized for low frequencies of the order of approximately 100 cycles per second to 20 kilocycles per second, and which consists of a plurality (three or more) of vibrators of rectangular plate form with one end of each fixed integrally to a common supporting body and an element having electromechanical conversion effect such as, for example, a thin plate of piezoelectric or electrostriction material, bonded to each vibrator, utilization being made of the operational characteristics of two or more units of U-shaped tuning forks. Each unit is formed from the combination of two of the vibrators, whereby the operations of two or more units of U-shaped tuning forks are effectively combined and utilized by selecting the electromechanical elements for driving and picking up of electrical energy through suitable combination.

The nature, principle, and details of the invention will be more clearly apparent by reference to the following description of a few embodiments of the invention when taken in conjunction with the accompanying illustrations in which like parts are designated by like reference numerals and letters, and in which.

Figure 1A:
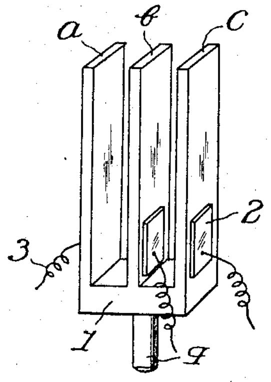
FIGS. 1A, 1B, 2A, 2B, 3A, 3B, 4A and 4B are perspective views A and elevational views B showing, respectively, embodiments of the principal structure of a wave filter according to the invention.
Figure 1B:
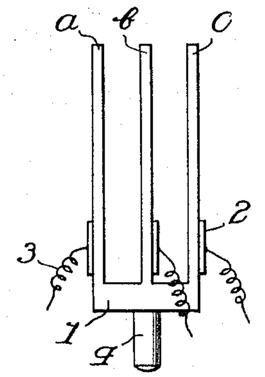

Referring to FIG. 1, which illustrates a perspective view A and an elevational view B showing the construction of the principal structure of one embodiment, the principal structure is a metallic vibrating body 1 having vibrators or resonators *a*, *b*, and *c*. On the outer sides of the outer resonators *a* and *c*, in the vicinity of their root portions, and on one side of the center resonator *b*, in the vicinity of its root portion, electromechanical transducers 2 made of a piezo-electric or electrostriction material are secured. A lead wire 3 is connected to each of the outer electrodes of these transducers 2. The ceramic base body of each of these transducers 2 is a miniature, thin plates made from a substance of such a group as, for example, the barium titanate group or the lead zirconate, lead titanate group, and is coated with baked-on silver films on both sides thereof so as to form an electrode.

When an electrical input is impressed, through one or two of the lead wires 3, simultaneously on the electrode surface of one or two of the transducers 2, this electrical input is converted into mechanical energy by piezo-electric effect or electrostriction effect, whereupon the metallic vibrating body 1 undergoes vibration as a combined body of three U-shaped tuning forks composed of resonators *a* and *c*, *a* and *b*, and *b* and *c*. Accordingly, it is possible to convert this mechanical vibration, by means of one or two transducers other than the driving transducer into electrical energy and to pick it up in an output circuit.

A protrusion 4 extending downwardly from the extreme lower end of the metallic vibrating body 1 is a stud for holding fast in a mounted condition the vibrating body 1.

Figure 2A:
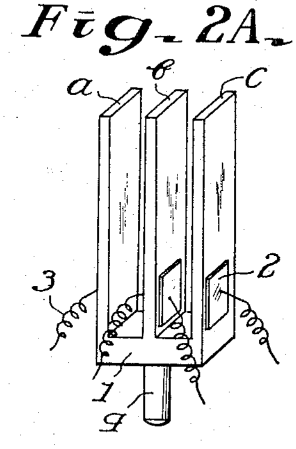
Figure 2B:
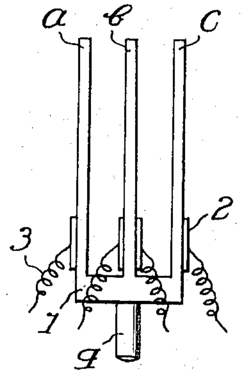
Figure 3A:
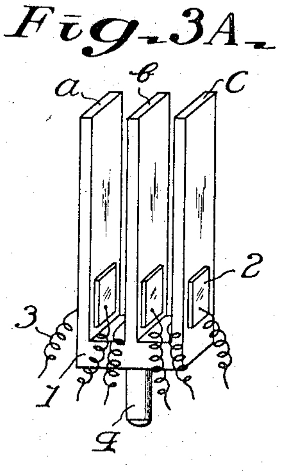
Figure 3B:
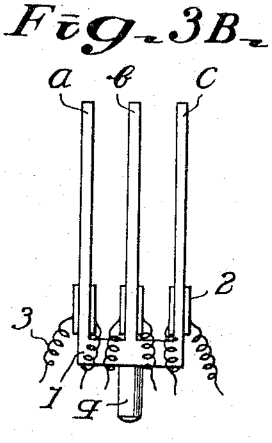

FIGS. 2 and 3 illustrate perspective views A and elevational views B showing the construction of other embodiments of the invention, which differ from that of FIG. 1 in the arrangement of the thin plates of piezo-electric or electrostriction material. That is, in the embodiment of FIG. 2, the center resonator has two such plates, one on each side thereof, near its root portion, and in the embodiment of FIG. 3, each of the resonators *a*, *b*, and *c* has two such plates, one on each side thereof, near its root portion. Although the operations of these embodiments are the same as that in the case of FIG. 1, two to three transducers for driving and picking-up can be connected simultaneously in the case of the embodiments of FIGS. 2 and 3, which thereby have the advantage of further reduction in transmission loss.

Figure 4A:
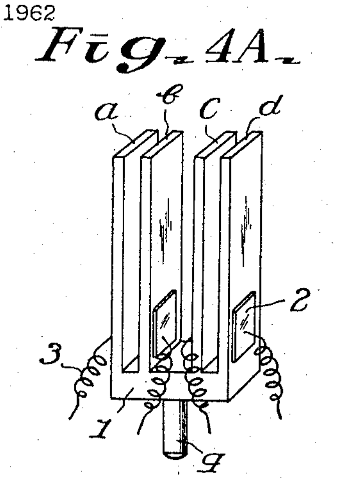
Figure 4B:
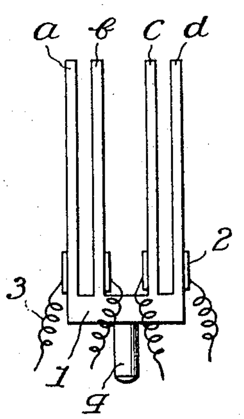

The construction of the principal structure of still another embodiment of the invention in the case wherein four vibrators *a*, *b*, *c*, and *d* are used is shown in the views of FIG. 4. As shown, a transducer 2 is secured to one side of each of the resonators near its root portion, on the outer sides in the case of the outer resonators *a* and *d*, and on the inner sides in the case of the inner resonators *b* and *c*. With this arrangement, the filter vibrates principally as a combined body composed of four units of U-shaped tuning forks *a* and *d*, *a* and *c*, *b* and *c*, and *b* and *d*.

Figure 5:
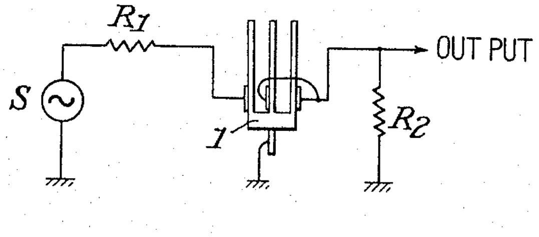
FIG. 5 is an electrical circuit diagram illustrating one example of a circuit suitable for use with the filter of the invention.

The mechanical filter for low frequencies of this invention is used in conjunction with such a circuit as is exemplified in FIG. 5. This circuit comprises a signal generator S, an input terminal resistance $R_1$, a mechanical filter according to the invention, and an output terminal resistance $R_2$, the parts named being connected as shown. When a signal is generated by the signal generator, it is transmitted through the resistance $R_1$ and is impressed on one of the transducers made of piezo-electric or electrostriction material, thereby driving the resonator to which the transducer is secured. Then, the vibratory motion of this resonator causes electrical energy to appear at the other two transducers made of piezo-electric or electrostriction material. This electrical energy is picked up by means of the terminal resistance $R_2$ of the output side.

Figure 6:
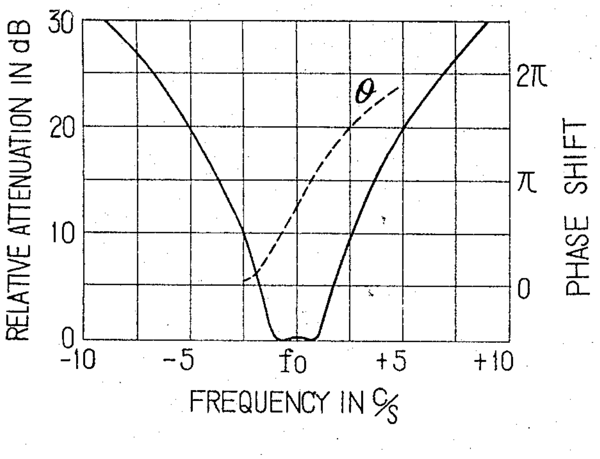
FIG. 6 is a graphical representation showing a typical frequency characteristic and phase-shift characteristic of a wave filter according to the invention.

Through the use of the mechanical filter according to this invention, excellent relation characteristics can be obtained as is illustrated by one example of a frequency characteristic and a phase-shift characteristics in FIG. 6. At the same time, since the phase shift become $\pi$ radians within a band, the interchangeability between a wave filter and an oscillator, which has heretofore been difficult with U-shaped, single tuning forks of conventional type, can be achieved readily in a mechanical wave filter according to this invention.

Since, as has been described above, the wave filter according to this invention has a construction which, in effective performance, may be considered to be a combined body of two or more units of U-shaped tuning forks made up of three or more vibrators of the form of single-end fixed (or cantilever) rectangular plates, the attenuation gradient of this wave-filter is considerably greater than that of a conventional U-shaped, single tuning fork. Moreover, by suitably adjusting the resonance frequency of each U-shaped tuning fork, it is possible to obtain, in an easy manner, such characteristics as a double-hump filtration characteristic.

When the mechanical wave filter for low frequencies according to this invention is used under conditions of substantial external vibration, since the frequency band of the external vibration is in the vicinity of the frequencies of the filter, there is the possibility of the filter being adversely affected by such detrimental effects as fluctuation in the filtration frequency and drop in the oscillation intensity. In order to eliminate such detrimental effects, the principal structure of the filter is mounted on a base over an elastic, insulating material, whereby external vibrations are effectively cut off by absorption so as to enable the filter to operate always in a normally correct manner even under conditions of external vibration. Such an arrangement has been achieved with a simple construction, which, moreover, is convenient for easy assembly.

Figure 7:
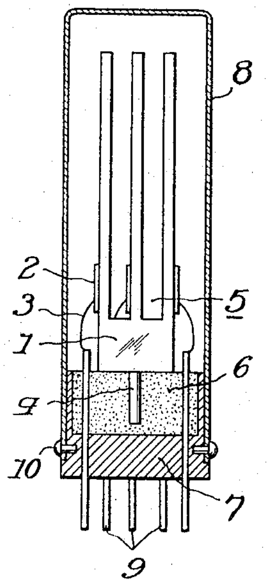
FIG. 7 is an elevational view, in vertical section, illustrating the construction of a typical embodiment of the invention reduced to practical form.

The construction of an embodiment of the mechanical wave filter for low frequencies according to the invention, reduced to practical form, is shown in a sectional view in FIG. 7. The principal structure of the wave filter 5 comprising a metallic vibrating body 1, transducers 2 made of piezo-electric or electrostriction material, and lead wires 3 are mounted on an elastic, insulating member 6 of cylindrical column shape made from such a material as, for example, silicone rubber. The vibrating body, is secured to the elastic member 6 by the forcible insertion of its stud 4 into a hole, of somewhat smaller free diameter than the stud 4, in the elastic, insulating member 6, whereby the elastic property of the member 6 is utilized for achieving elastic anchoring. The elastic member 6 is, in turn, forcibly fitted into a base 7 of cylindrical cup shape which has an inner diameter somewhat smaller than the free outer diameter of the elastic member 6, and which is a molded article of such a material as, for example, phenolic resin. The elastic property of the elastic member 6 is thus utilized for achieving elastic anchoring. Thus, the filter structure 5 is mounted and secured to the base 7 over the elastic member 6.

The wave filter of FIG. 7 is further provided with input and output terminals 9, which are for impressing input signals and leading out output signals, and which pass through and are partly embedded in the base 7 and pass through the elastic member 6, and are connected at their inner ends by the lead wire 3 to their respective transducers 2. The entire assembly, except for the terminals 9, is encapsulated within a protective cover 8 which is secured to the base 7 by means of a fastening means 10.

Although this invention has been described with respect to a few particular embodiments thereof, it is not to be so limited since changes and modifications may be made therein which are within the full intended scope of the invention, as defined by the appended claims.

What I claim is:

1. An electromechanical filter comprising, a tuning fork having a plurality of arms, for each arm a piezoelectric transducer thereon adjacent a root thereof, means for impressing an electric signal on one of said transducers for vibrating said one of said arms thereby to vibrate the others of said arms, the others of said arms comprising two arms, pick-off means comprising the transducers on the other arms of said tuning fork to pick-off inverse signals from said others of said arms as a combined output, whereby control of the pass band of said filter is a function of the resonant frequencies of said other arms.

2. An electromechanical filter comprising, a tuning fork having a plurality of arms, for each arm a piezoelectric transducer thereon adjacent a root thereof, means for impressing an electric signal on one of said transducers for vibrating said one of said arms thereby to vibrate the others of said arms, pick-off means comprising the transducers on the other arms of said tuning fork to pick-off inverse signals from said others of said arms as a combined output, said pickoff means including means connecting said two transducers differentially, whereby control of the pass band of said filter is a function of the resonant frequencies of said other arms.

3. An electromechanical resonator apparatus comprising, a tuning fork having a plurality of arms, a piezoelectric transducer mounted on one of said arms adjacent a root thereof, means for impressing an electric signal on said transducer for vibrating said one of said arms thereby to vibrate the others of said arms, pickoff means connected to the other arms of said tuning fork to pick off inverse signals from said others of said arms as a combined output, said other arms comprising two arms and said one arm disposed intermediate said two arms, and said one arm being spaced different distances from said other arms.

4. An electromechanical resonator apparatus comprising, a tuning fork having a plurality of arms, a piezoelectric transducer mounted on one of said arms adjacent a root thereof, means for impressing an electric signal on said transducer for vibrating said one of said arms thereby to vibrate the others of said arms, pickoff means connected to the other arms of said tuning fork to pick off inverse signals from said others of said arms as a combined output, said pickoff means comprising piezoelectric transducers mounted on the root of said two arms, and means connecting the last-mentioned transducers differentially.

References Cited

UNITED STATES PATENTS

| | | | |
|---|---|---|---|
| 2,081,405 | 5/1937 | Mason | 310—9.8 |
| 2,152,955 | 4/1939 | Coyne | 333—71 |
| 2,445,719 | 7/1948 | Sylvester | 310—9.6 |
| 2,666,196 | 1/1954 | Kinsley | 340—171 |
| 3,015,789 | 1/1962 | Honda | 333—72 |
| 3,024,429 | 3/1962 | Cavalieri | 333—72 |
| 3,064,213 | 11/1962 | Mason | 333—71 |
| 3,264,585 | 8/1966 | Poschenrieder | 333—72 |

HERMAN KARL SAALBACH, *Primary Examiner.*

C. BARAFF, *Assistant Examiner.*